(12) United States Patent
Mattox

(10) Patent No.: US 6,522,290 B2
(45) Date of Patent: Feb. 18, 2003

(54) TRANSMIT PHASE REMOVAL IN FM HOMODYNE RADARS

(75) Inventor: Barry G. Mattox, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/865,594

(22) Filed: May 29, 2001

(65) Prior Publication Data

US 2002/0196179 A1 Dec. 26, 2002

(51) Int. Cl.[7] .......................... G01S 13/00; G01S 13/08; G01S 13/58
(52) U.S. Cl. ...................... 342/194; 342/115; 342/127; 342/135
(58) Field of Search ................................ 342/104–146, 342/194

(56) References Cited

U.S. PATENT DOCUMENTS

| 3,889,261 A | * | 6/1975 | Sirven | 343/14 |
| 5,289,188 A | * | 2/1994 | Chudleigh, Jr. | 342/58 |
| 6,040,898 A | * | 3/2000 | Mrosik et al. | 356/5.09 |
| 6,211,815 B1 | * | 4/2001 | Richey et al. | 342/194 |
| 6,317,074 B1 | * | 11/2001 | Johnson | 342/82 |

\* cited by examiner

Primary Examiner—Thomas H. Tarcza
Assistant Examiner—Brian Andrea
(74) Attorney, Agent, or Firm—Burns, Doane, Swecker & Mathis, LLP

(57) ABSTRACT

In a homodyne-receiver radar system used for ranging and/or target detection, the frequency-modulated (FM) transmit phase are removed from the received signal. Removal of the known FM transmit phase from the received signal reduces the bandwidth of the received signal to half that of a system that does not remove the transmit phase. This allows the sampling rate, and thus the processor throughput, to be cut in half. With the FM transmit phase removed, the phase sequence of the processed signal is akin to a delayed version of the transmit signal phase history. This allows the range processing to use segments of a single phase sequence for processing all range gates, resulting in a large reduction in the amount of coefficient storage used for the matched-phase sequences required to process the set of range gates.

17 Claims, 3 Drawing Sheets

TRANSMIT PHASE REMOVAL IN FM HOMODYNE RADARS

TECHNICAL FIELD

This invention involves radar signal processing. In particular, the present invention pertains to phase processing of received radar signals to reduce processing during range or target detection.

BACKGROUND OF THE INVENTION

Radar systems have long been used to detect information about one or more target objects. The detected information may include, for instance, the position, direction of movement, velocity and/or acceleration of the target objects. Some radar systems transmit pulse or waveform signals having a fixed frequency. Other systems feature the use of waveforms with varying frequency, such as linear frequency modulated chirp pulses.

Radar systems can be categorized as being either a pulsed radar system or a continuous wave (CW) radar system, e.g. frequency modulated continuous wave (FMCW) radar system. Pulsed radars are fundamentally different from CW radars in several respects, including how the transmission signal is generated and varied over time. Both pulsed radars and FM-CW radars are described in *Introduction to Radar Systems,* 2nd Ed., McGraw-Hill 1986, Merrill Skolnik, which is incorporated by reference herein in its entirety.

Both pulsed radars and also FM-CW radars rely upon signal processing to detect the target object echo, sometimes called the return signal or reflection signal. Weak return signals and signals with high SNR are difficult to detect and often require complicated, computationally burdensome signal processing schemes.

SUMMARY OF THE INVENTION

Exemplary embodiments of the present invention are drawn to systems and methods for radar signal processing within a radar system to detect target objects. Signals are transmitted from a radar system according to predetermined frequencies having predefined transmission phase sequences. The return signals are from a target object and received back at the radar system. In accordance with the present invention, the transmit phase is removed from the homodyne-detected received return signal and the received signal having said transmit phase removed is analyzed to detect the presence of a return signal from the target object.

Exemplary embodiments of the present invention include performing an analog-to-digital conversion of the received signal, separating the received signal into quadrature I & Q components, and an initial low pass filtering the received signal. After the initial low pass filtering, exemplary embodiments of the present invention perform further low pass filtering by a second low pass filter acting on the received signal having said transmit phase removed. The step of removing the transmit phase from the received signal can be performed by multiplying a complex signal sequence of the received signal by a complex conjugate of the transmitted phase sequence. This can involve storing one cycle of the transmitted phase sequence for use in removing the transmit phase from the received signal, the length of the stored cycle of the transmitted phase sequence being determined by the relationship: $2 \cdot \Delta f/f_m$, wherein a variable $\Delta f$ equals peak FM deviation and a variable $f_m$ equals a modulation rate.

In accordance with exemplary embodiments of the present invention, the received signal with its transmit phase removed can be applied to a number of range gates, each of which is matched to a delayed version of the transmitted signals from the radar system.

BRIEF DESCRIPTION OF THE DRAWINGS

These, and other objects, features and advantages of the present invention will become readily apparent to those skilled in the art upon reading the following detailed description, in conjunction with the appended drawings, in which.

DETAILED DESCRIPTION

Figure 1:
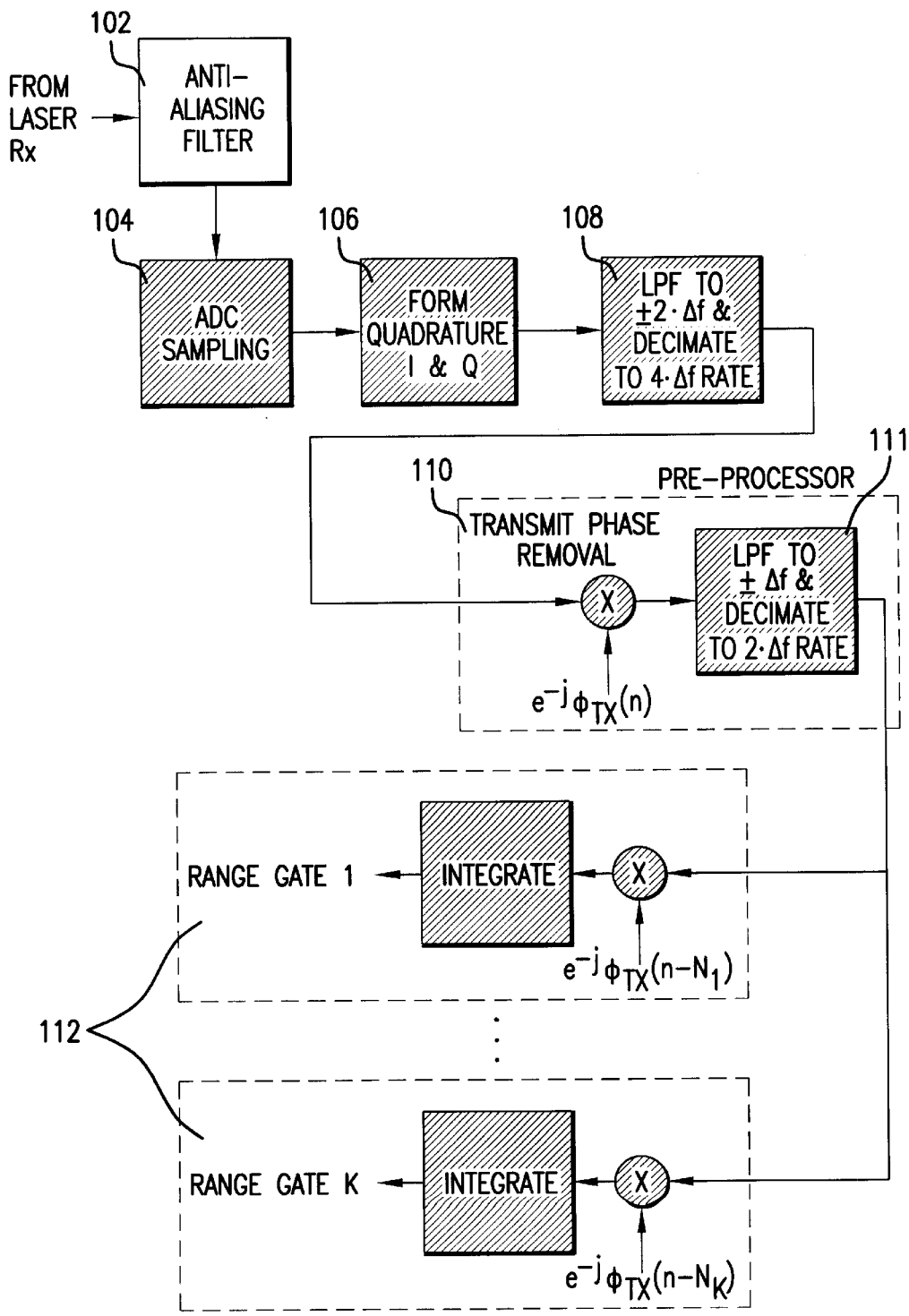
FIG. 1 depicts a homodyne system signal processor in accordance with an exemplary embodiment of the present invention.

Radar receivers, in both pulsed radars and FM-CW radars, use signal processing to detect the target objects. For example, signal processing is used to determine whether a received signal includes a return signal from a target object, sometimes called an echo signal or reflected signal. Weak return signals and signals with low SNR tend to be difficult to detect and often require complicated, computationally burdensome signal processing schemes.

The return signal received in a homodyne radar receiver, for example, a linear FM-CW homodyne radar receiver, has a phase characteristic. The phase of a received signal is the difference in phase between the transmitted signal and the corresponding return signal. The difference signal may comprise one or more sine waves which each represent a target object. Analysis of the difference signal may provide information about the relative speed, direction and size of target objects. The difference signal is passed through an anti-alias filter, sampled at a constant sampling rate, and converted to a digital form using an analog-to-digital (A/D) converter. The resulting signal is provided to the radar signal processor for processing which may include fast Fourier transform (FFT) filtering, since radar systems generally use some form of FFT filtering to perform coherent integration and transform the return signal from the time domain to the frequency domain. Further signal processing can then be performed to analyze the return signals in frequency domain form.

For an FM-CW radar with a peak FM deviation of $\Delta f$, the sampling rate into the range gates of radar homodyne receiver systems must be at least $4 \cdot \Delta f$ complex samples/ second in order to avoid signal and noise folding in the sampled signal spectrum. Furthermore, each of the phase sequences $\phi_i(n)$ that match the radar returns from various ranges are unique. That is, one is not just a delayed version of another. This means that $N_R$ range gates entails the storage of $N_R$ sequences of $4 \cdot \Delta f/f_m$ complex phase samples for a total of $N_R \cdot 4 \cdot \Delta f/f_m$ complex coefficient locations that must be stored for range processing. The present invention reduces these storage requirements as well as the accompanying processing burdens.

The present invention removes the known frequency-modulated (FM) transmit phase from the received signal in an FM homodyne-receiver radar system which is used for detecting a target object or finding its range. Removal of the FM transmit phase reduces the bandwidth of the received signal to half that of a system that does not remove the transmit phase. In this way, the sampling rate, and thus the processor throughput, may be cut in half. Transmit phase removal also causes the phase sequence of the processed signal to be a simple delayed version of the transmit signal phase history. This allows the range processing to use segments of a single phase sequence for processing all range gates, resulting in a large reduction in the amount of coefficient storage used for the matched-phase sequences required to process the set of range gates. The present invention can be used with frequency-modulated laser radars or RF radars which use homodyne receivers.

Use of the present invention reduces the bandwidth by approximately a factor of two. This reduction in bandwidth due to transmit phase removal tends to reduce the costs of signal processing hardware by a factor of two. The reduction factor in storage afforded by the technique is on the order of the number of range bins processed by the system.

As a result of the reduction of the coefficient storage requirements, a radar system according to the present invention generally can have a complete set of coefficients residing within the digital signal processor (DSP) internal memory, instead of requiring external memory due to internal memory size limitations. This, in turn, allows the processing to proceed at the rated speed of the device compared with the greatly reduced processing speed constrained by the slower processing speeds attributable to external memories being accessed. This may reduce the processor hardware costs by an additional factor of two, and the absence of external memory requirements also reduces parts count, further reducing costs. Thus, if range processing requirements dictate the signal processing design, the technique typically reduces the signal processing hardware costs by a factor of four or more.

FIG. 1 depicts a block diagram of an exemplary embodiment of a homodyne-system signal processor 100 with transmit phase removal, in accordance with the present invention. The homodyne-system signal processor 100 includes an anti-aliasing filter 102 disposed to receive a signal from a receiver unit. The anti-aliasing filter 102 is connected to an ADC unit 104, which is connected to a quadrature I & Q unit 106, which, in turn, is connected to a low pass filter (LPF) unit 108. The low pass filter unit 108 of the homodyne-system signal processor 100 is connected to a phase removal pre-processor 110, which is disposed to provide inputs to a number K of range gates. In alternative embodiments, the ADC unit 104, the quadrature I & Q unit 106, and the LPF unit 108, can all be configured within the same processor unit of the signal processor 100, or can be configured as separate units. In various embodiments of the present invention, the transmit phase removal pre-processor 110 can be configured within, or outside of, such a processor unit which includes one or more of the 102, 104, 106 and 108 units.

A received signal, e.g., a signal from the radar receiver downconverted to an intermediate frequency (IF) carrier, is input to the anti-aliasing filter 102. For example, a laser light frequency signal received at the antenna can be converted down to video frequencies in the radar receiver assembly, and then provided to the anti-aliasing filter 102 as an input for further processing. The anti-aliasing filter 102 is designed to prevent aliasing of noise, while passing the radar signal with low distortion. The filter cut-off frequency can be somewhat outside of the radar signal bands, but will effectively eliminate noise that would otherwise be aliased when sampled at the ADC sampling rate of $f_s$. The choice of $f_s$ is a tradeoff between allowing a simple lower order analog anti-aliasing filter, which is allowed if $f_s$ is high, and the increased cost of ADC and digital LPF as $f_s$ increases. The anti-aliasing filter 102 reduces noise above one-half the sampling frequency to eliminate aliasing of noise by the A/D sampler, and provides the signal to the ADC sampling unit 104.

The ADC unit 104 takes a periodic sample, or voltage measurement, at regular points along the analog input signal, and then performs an analog-to-digital (A/D) conversion of the samples. In one embodiment, a sample of the incoming analog signal taken at a sampling rate is compared to a known scale of incrementally increasing voltages. The ADC unit 104 assigns a binary digital value to the sample on the basis of its magnitude in comparison to the known scale, thus converting the analog signal received at its input into a digital signal which is provided to the Quadrature I & Q unit 106. In this way, the analog signal input to the ADC unit 104, e.g., a signal from a laser receiver (RX), is converted to a digital signal which can then be used for further signal processing in the system 100.

The Quadrature I & Q unit 106 resolves the digital signal from the ADC unit 104 into two component signals, an "I" component (i.e., "in-phase" component) and a "Q" component (i.e., "quadrature" component). The two components have the same frequency and maximum amplitude, but differ in phase by 90°. The signal processing of a received signal is performed using both the I and Q components. The present disclosure refers to signal processing being performed on one signal, which can be characterized in terms of the complex quantity I+jQ. The Quadrature I & Q unit 106 provides the signal, having I and Q components, to low pass filter unit 108.

The low pass filter unit 108 eliminates unwanted high frequency noise interference components from the signal. For a peak FM deviation of $\Delta f$, a digital anti-aliasing low pass filter can be used with a bandwidth of approximately $4 \cdot \Delta f$. This allows the signal to pass without attenuation. The signal bandwidth will be approximately zero when the range of the target object is such that the signal is delayed by an exact multiple of the modulation period. On the other hand, the signal bandwidth grows to approximately $4 \cdot \Delta f$ when the target range results in delaying the signal by an exact multiple of the modulation period plus one-half period. This is because the receiver signal phase is the difference between the transmitted phase and the received phase, which is a delayed version of the transmitted phase.

In preferred embodiments of the present invention the transmit phase of the received signal is removed following the low pass filter unit 108. Transmit phase removal can be achieved by multiplying the complex signal sequence of the received signal by the complex conjugate of the transmitted phase sequence, the received signal being synchronized to the transmitted FM without delay. This entails storage of one cycle of the FM phase, or $4 \cdot \Delta f/f_m$ complex phase samples, in the pre-processor for use in removing the phase. Here, $f_m$ is "modulation rate," that is, the "frequency" of a cosine function, or other FM modulation function, which is used to modulate the transmit frequency. In other words, the FM (frequency modulation) involves varying the transmit frequency up and down in the manner of a cosine function having a frequency of $f_m$. Thus, for $f_m$=100 Hz, the transmit frequency is varied from a maximum transmit frequency to a minimum transmit frequency and back to the maximum transmit frequency 100 times per second. After phase removal, the signal bandwidth is constant and is one-half that of the maximum bandwidth before transmit phase removal.

One result of removing the transmit phase from the signal being processed is that it enables further noise reduction which can not be realized in conventional systems. Phase removal allows the use of an additional low-pass filter 111 that restricts the signal to ±Δf, which further reduces the noise bandwidth. In FIG. 1, the low-pass filter 111 is depicted within the pre-processor 110. However, in alternative embodiments, the low-pass filter 111 can be configured apart from the pre-processor 110. Other alternative embodiments exist in which there is no low-pass filter 110, and the signal having its transmit phase removed is fed through to the range gates. In either case, since the radar signal bandwidth is now constrained to 2Δf rather than the initial maximum bandwidth of 4Δf, the complex signal sampling rate can be reduced to as little as 2Δf with no signal aliasing.

Following the removal of phase in the pre-processor 110, and low-pass filtering of LPF 111, if any, the signal is provided to range gates 112 for further processing. The signal is provided to K range gates configured in parallel, and each varying in phase, for calculation of the target object range.

Each of the K range gates is matched to a signal that would result from a radar target at a range of $R_i$, where the various $R_i$ can be uniformly distributed or otherwise chosen. The phase of the complex sequence used to process a range gate matched to range gate $R_i$ is the transmit phase sequence (e.g., sampled at the 2·Δf processing rate) delayed by $N_i$ samples, where $N_i$ samples represents the delay closest to the round-trip radar return time to the target, at range $R_i$. The number of samples $N_i$ may be determined in accordance with the following relationship:

$$N_i = [2 \cdot R_i/c]/[\text{sample rate}] = R_i/[c \cdot \Delta f] \quad (1)$$

The integrator portion of each range gate could be a low-pass filter for stationary target detection. For targets that may be moving, a Doppler filter bank, such as an FFT, can be used for each range bin in place of the integrator in order to resolve the target energy in velocity, as well as in range.

ware requirements for range finding. With the phase removed, the matched range-gate phase sequences may be thought of as being delayed versions of a single phase sequence rather than being unique phase sequences. Hence, only a single FM cycle of transmitted phase needs to be stored. This means that the total coefficient storage may include of a single sequence of $2 \cdot \Delta f/f_m$ complex phase samples, i.e., complex coefficient locations. Each range gate accesses the single stored sequence starting at an offset into the coefficient sequence table corresponding to the range delay of that gate.

One benefit of the present invention is that the reduction of coefficient storage by a factor of $2 \cdot N_R$ typically allows all coefficients to reside within the internal high-speed memory section of the signal processing device. Because internal memory accesses allow the processor to run at the full rated speed of the device rather than adding wait states for external memory accesses, the processing efficiency can be a factor of two or faster by using the reduced coefficient requirement. Combining this factor with the sampling rate factor typically results in a factor of four or more in reduced processor count, assuming that multiple processors are required to provide the total processing throughput for the range processing.

Because the stored-sequence coefficients can be stored internally in the signal processor devices, the design of each processor element may also be less complex, perhaps obviating the need for external memory. A comparison of exemplary processing hardware configurations for the present invention, as compared to conventional systems, is provided in Table 1. It should be noted that the figures in the table do not consider the rounding up of the number of processing elements required to the next highest integer number.

TABLE 1

| Method | Throughput (samples/sec) | Coefficient Storage | Memory Complexity | Processor Efficiency | Processor Requiremts |
|---|---|---|---|---|---|
| Conventional | $4 \cdot \Delta f \cdot N_R$ | $4 \cdot N_R \cdot \Delta f / f_m$ | add exter'l coefficients | 50% slower memory | 1× |
| Transmit φ Removal | $2 \cdot \Delta f \cdot N_R$ | $2 \cdot \Delta f / f_m$ | internal memory | 100% | ¼× |

The magnitudes of the integrator outputs or of the FFT outputs are typically compared to a detection threshold to determine the presence of a target.

Another result of phase removal is the reduction in processing requirements which may be realized. Because of the halved maximum bandwidth, the sampling rate into the range gates can be reduced from 4·Δf to 2·Δf complex samples/second and still ensure that the sampled signal, and noise spectrum, will not fold. This can reduce the processing hardware by as much as a factor of two.

Removal of phase in the received signal, in accordance with the present invention, also serves to reduce the hard- Some of the benefits of the present invention may be better appreciated by considering a hypothetical example. For instance, consider an example where $f_m$=75 Hz, Δf=500 kHz, $N_R$=100, and a processing element capable of handling $P_{THRU}$=15 M samples/second (e.g., a 100 MHz processor requiring six passes of operations on each piece of data and operating with 10% margin).

Table 2 compares the numbers associated with the purely recurring costs of hardware for the two techniques. In the exemplary embodiment depicted, it is assumed that complex numbers are stored as 8 bytes.

TABLE 2

| Method | Throughput (samples/sec) | Coefficient Storage | Memory Complexity | Processor Efficiency | Processor Rqmts |
|---|---|---|---|---|---|
| Conventional | $4 \times 10^8$ | 43 Mbytes | add exter'l coefficients | 50% | 54 devices |
| Transmit φ Removal | $2 \times 10^8$ | 107 kbytes | internal memory | 100% | 14 devices |

The conventional approach, in addition to requiring 54 devices instead of 14, requires that each device include 43 MBytes of external memory. In the absence of an available commercial off-the-shelf (COTS) products with sufficient memory, a custom design would be required which would entail significant non-recurring design and production setup cost. The present invention, on the other hand, can be accommodated in a COTS processor product. Furthermore, additional costs for the conventional approach would be incurred due to any special software drivers for the custom board designs which may be necessary. These non-recurring costs, if amortized over the systems produced, would show additional savings that occur using the invention instead of the conventional approach.

Figure 2:
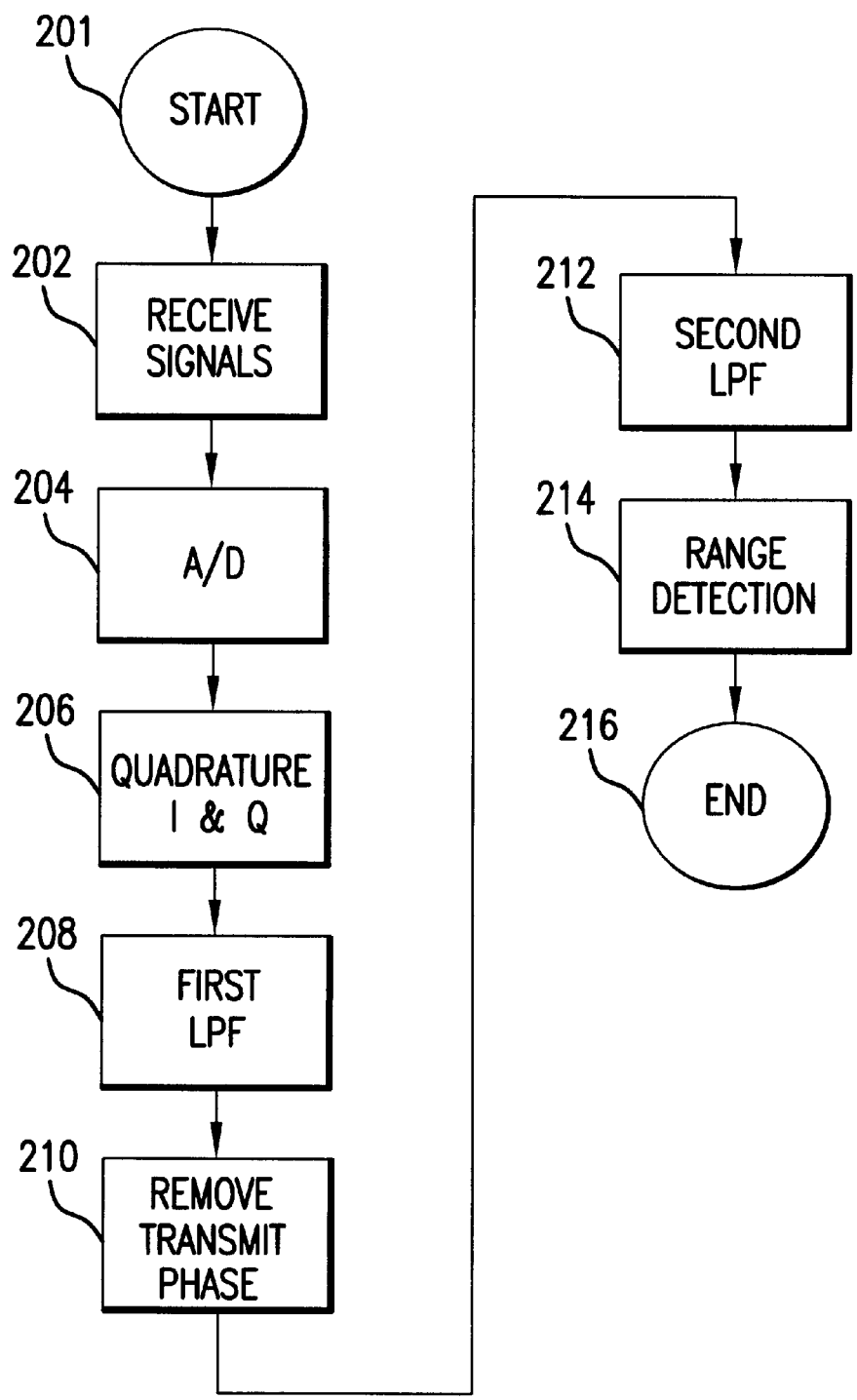
FIG. 2 depicts a method of radar signal processing in accordance with an exemplary embodiment of the present invention.

FIG. 2 depicts a method of radar signal processing by removing the transmit phase from the received radar signal, in accordance with an exemplary embodiment of the present invention. Radar signals are transmitted according to a predetermined frequency scheme with a known phase sequence. Some of the transmitted signals are reflected from a target object back towards the receiver.

The method begins in step 201, and in step 202 transmitted radar signals echoed from the target object are received by the radar system. The signals may be received in the front end of a radar, or receiver section, via an antenna or like type of detector. The receiver can include a bandpass filter to prevent aliasing of noise due to A/D sampling. The method proceeds to step 204 to begin signal processing of the received signal. The processing performed in steps 204, 206, 208, 210 and 212 may be called preprocessing and generally include analog-to-digital (A/D) conversion of the signal, resolving the signal into quadrature I & Q components, lowpass filtering, removal of transmit phase, and final lowpass filtering of the signal.

In step 204, the received signal is A/D digitized into a binary digital value to convert the analog signal into a digital signal. The digital signal resulting from step 204 is provided to a quadrature I & Q unit for further processing in step 206. In step 206 the signal is resolved into I & Q quadrature components, resulting in two component parts of equal magnitude and frequency, but differing in phase by 90°. In step 208, low pass filtering eliminates unwanted high frequency portions of the signal which contain noise and negligible amounts of radar return signals. The method then proceeds to step 210. It should be noted that, while the present description illustrates a digital embodiment of I & Q quadrature components from a receiver constructed to digitize an analog signal at an intermediate frequency (IF), other receiver structures can be used in accordance with the present invention that produce I & Q analog quadrature components that are separately converted by two A/D converters, or by using other like techniques.

In step 210 the transmit phase of the received signal is removed, in accordance with a preferred embodiment of the present invention. Removal of the transmit phase may entail multiplying the received signal complex sequence by the complex conjugate of the transmitted phase sequence. In a preferred embodiment, this can be done by storing one known transmit cycle for the FM phase, i.e., $4 \cdot \Delta f/f_m$ complex phase samples, in the pre-processor.

Upon removing the transmit phase from the received signal in step 210, the method proceeds to step 212 for additional low pass filtering. Following the low-pass filtering of step 212, the signal is provided to a configuration of range gates for range detection of the target object in step 214. The method ends in step 216.

Figure 3:
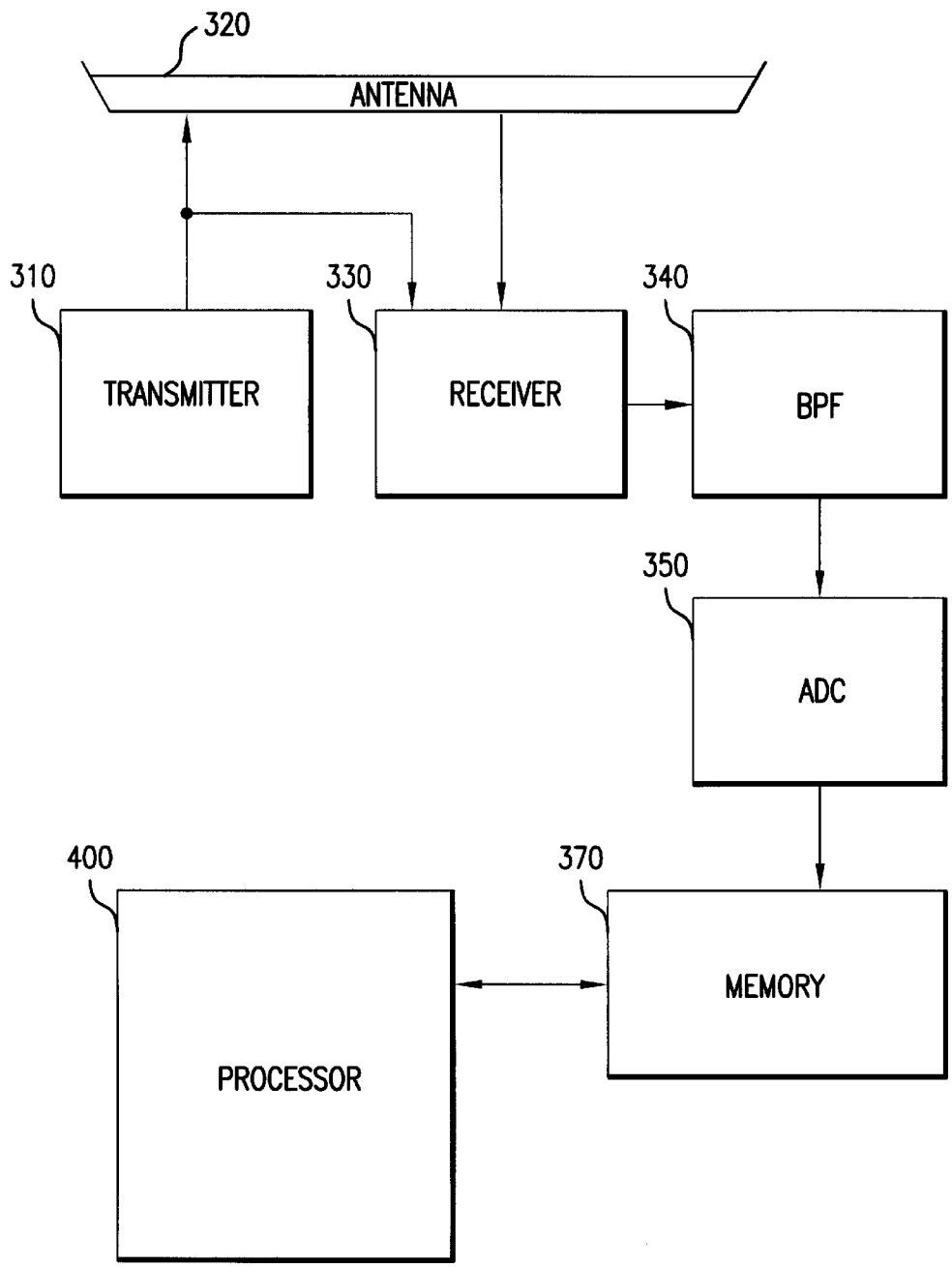
FIG. 3 depicts an exemplary embodiment of a radar system which may be used in accordance with the present invention.

FIG. 3 depicts an exemplary embodiment of a radar system which can be used in accordance with the present invention. An active radar transmits signals from a transmitter 310, which can either use a dedicated transmitter antenna or an antenna 320 shared with a receiver 330 of the radar. Return signals, which are echos of the transmitted active radar signals reflected from a target object, are received at the receiver 330 via the antenna 320. The received signals are down-converted to an IF signal by mixing with a portion of the transmitted energy (with a possible frequency translation). The IF signals are band pass filtered and A/D converted by an anti-aliasing BPF 340 and an ADC 350, respectively.

Upon being A/D converted, the digital signals are then digitally processed to form I & Q quadrature components. In an alternative embodiment, the quadrature components can be produced by an analog quadrature detector before being digitized by dual A/D converters. After forming I & Q quadrature components, the signal is subjected to lowpass filtering, phase removal, final lowpass filtering, range-gate matching and coherent integration. The coherent integration is typically an FFT processor. The phase of the FFT products is discarded and the FFT magnitudes are tested to determine the presence of a target return.

During various stages of signal processing, signal manipulation and computation, signals can be saved, stored and retrieved in memory 370. Signal processor 400, which performs the preprocessing functions described earlier and signal processing for detecting the presence and other parameters of a target object return signal such as range, velocity and/or acceleration, can be embodied using multiple processors.

For illustrative purposes, the invention has been primarily described for use with FM-CW radar systems. The present invention can be used in radars that are gated or pulsed. Such techniques may be employed, for example with long range radars, to simplify or eliminate the need for antenna feed networks that must allow simultaneous transmitter and receiver operation. In addition, the present invention can be used in conjunction with FM-CW techniques which use frequency modulations other than linear FM sweep, that is, for general forms of modulations. For example, sinusoidal or other modulation waveforms can be used. In these systems, the signal processor correlates the received signal with the signal format expected from a target radar return. This format can be predicted for a given target range since the transmitted phase sequence is known.

Some aspects of the invention have been described in terms of sequences of actions to be performed by elements of a processor or computer system. It will be recognized that various actions disclosed herein may be performed by hard-wired electrical circuits, or by processor program instructions performed on one or more processors, or by some combination of each. Other embodiments of the invention can be comprised entirely of instructions stored in a computer readable storage medium, for execution by one or more processors to implement the methods and systems of the invention. All of these various forms and embodiments are contemplated to be within the scope of the invention.

The aforementioned embodiments and description of the present invention are intended to be illustrative rather than restrictive. Many variations of implementing the present invention can be derived from the description contained herein by a person skilled in the art. For example, in alternative embodiments the preprocessing steps of the present invention can be performed in an order other than that described herein. All such variations and modifications are considered to be within the scope and substance of the present invention, as defined by the following claims.

What is claimed is:

1. A method of radar signal processing within a homodyne-receiver radar system to detect a target object, the method comprising steps of:

transmitting a signal from a radar system, the radar signal being transmitted according to a predetermined frequency and having a transmit phase;

receiving a received signal at the radar system from a target object, the received signal including a return signal from the target object;

mixing the received signal with a portion of the transmit energy to impart transmit phase to the received signal; and removing the transmit phase from the received signal after the mixing to detect the return signal.

2. The method of claim 1, further comprising a step of:
   performing an analog-to-digital conversion of the received signal.

3. The method of claim 2, further comprising a step of:
   separating the received signal into quadrature I & Q components.

4. The method of claim 3, further comprising a step of:
   low pass filtering the received signal.

5. The method of claim 4, wherein the step of low pass filtering the received signal is performed by a first low pass filter, the method further comprising a step of:
   low pass filtering by a second low pass filter the received signal having the transmit phase removed.

6. The method of claim 1, wherein the step of removing the transmit phase from the received signal comprises:
   multiplying a complex signal sequence of the received signal by a complex conjugate of the transmit phase.

7. The method of claim 6, further comprising steps of:
   storing a cycle of the transmit phase for use in removing the transmit phase from the received signal.

8. The method of claim 7, wherein a length of the stored cycle of the transmit phase is characterized by a relationship wherein a variable $\Delta f$ equals peak FM deviation and a variable $f_m$ equals a modulation rate, the relationship being: $2 \cdot \Delta f / f_m$.

9. A method of radar signal processing within a radar system to detect a target object, the method comprising steps of:

transmitting signals from a radar system, the radar signals being transmitted according to a predetermined frequency and having a transmit phase;

receiving a received signal at the radar system from a target object, the received signal being echos from the target object of the transmitted signals;

mixing the received signal with a portion of the transmit energy to impart transmit phase to the received signal;

removing the transmit phase from the received signal;

applying the received signal to a plurality of range gates each matched to a delayed version of the transmitted signals from the radar system; and analyzing the received signal having the transmit phase removed to detect the presence of a return signal from the target object.

10. A radar signal processor apparatus within a radar system which detects a target object based on a return signal from the target object, the apparatus comprising:

a transmitter with a predetermined frequency and a transmit phase;

a receiver with a mixer for mixing a portion of the transmit phase with the received signal;

a phase removal pre-processor for removing the transmit phase from the signal out of the mixer; and a number of range gates for analyzing the signal from the pre-processor and detecting a target object.

11. The apparatus of claim 10, further comprising:
    an analog-to-digital conversion unit.

12. The apparatus of claim 11, further comprising:
    a quadrature I & Q unit.

13. The apparatus of claim 12, further comprising:
    a low pass filter.

14. The apparatus of claim 13, wherein the low pass filter is a first low pass filter, the apparatus further comprising:
    a second low pass filter.

15. The apparatus of claim 10, wherein the phase removal pre-processor multiplies a complex signal sequence of the received signal by a complex conjugate of the transmit phase.

16. The apparatus of claim 15, further comprising:
    a memory for storing a cycle of the transmit phase for use in removing the transmit phase from the received signal.

17. The apparatus of claim 16, wherein a length of the stored cycle of the transmit phase is characterized by a relationship wherein a variable $\Delta f$ equals peak FM deviation and a variable $f_m$ equals a modulation rate, the relationship being: $2 \cdot \Delta f / f_m$.

* * * * *